(No Model.) 2 Sheets—Sheet 1.
S. J. ADAMS.
TUBE WELDING BALL.
No. 361,565. Patented Apr. 19, 1887.
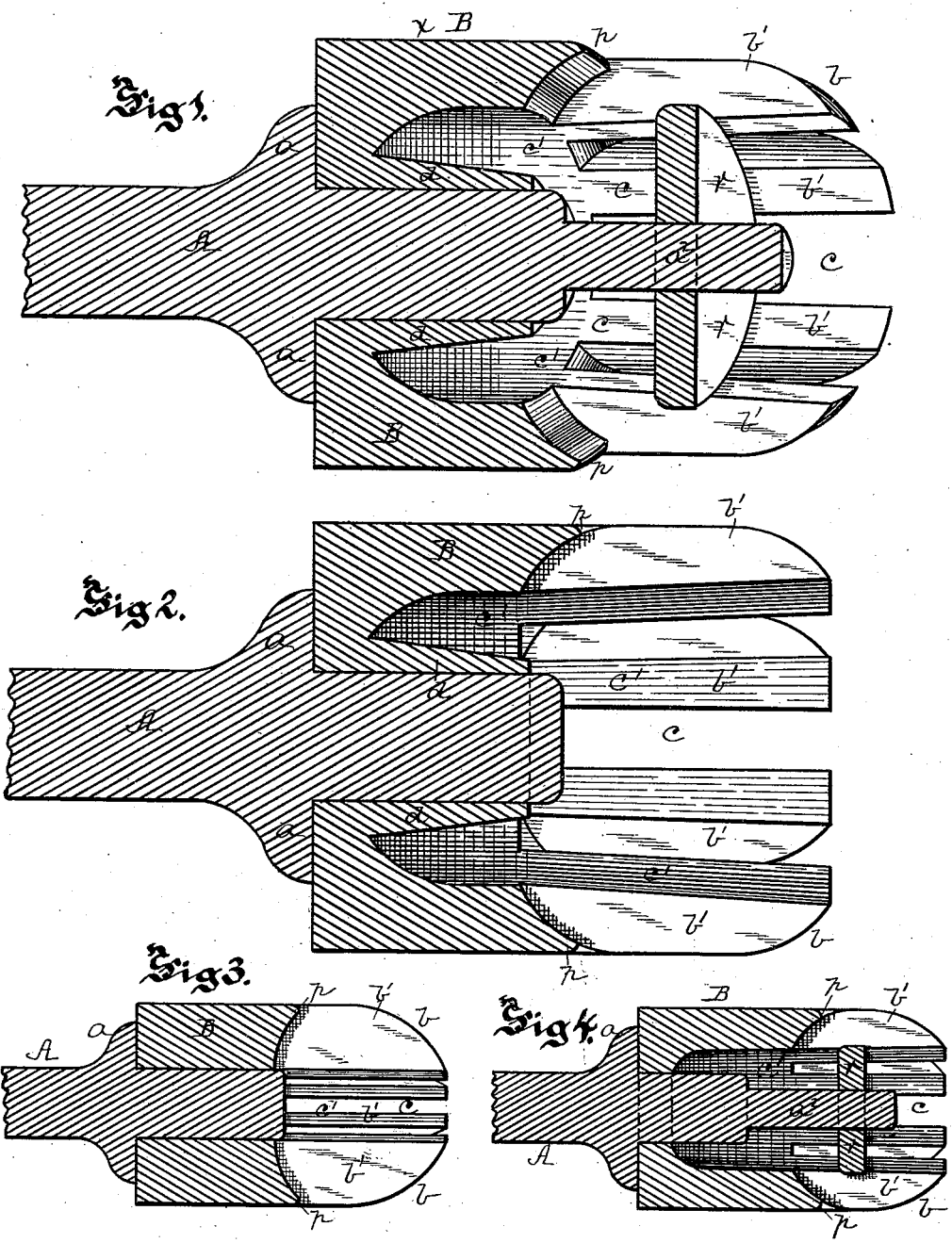

(No Model.) 2 Sheets—Sheet 2.

S. J. ADAMS.
TUBE WELDING BALL.

No. 361,565. Patented Apr. 19, 1887.

Witnesses:
J. T. Cooke
F. E. Barnes

Inventor.
S. Jarvis Adams,
By James I. Kay
Attorney

UNITED STATES PATENT OFFICE.

S. JARVIS ADAMS, OF PITTSBURG, PENNSYLVANIA.

TUBE-WELDING BALL.

SPECIFICATION forming part of Letters Patent No. 361,565, dated April 19, 1887.

Application filed November 15, 1886. Serial No. 218,874. (No model.)

*To all whom it may concern:*

Be it known that I, S. JARVIS ADAMS, of Pittsburg, in the county of Allegheny and State of Pennsylvania, have invented a new and useful Improvement in Tube-Welding Balls; and I do hereby declare the following to be a full, clear, and exact description thereof.

My invention relates to what are known as "pipe" or "tube" welding balls, these balls being formed of cast metal and supported between the welding-rolls upon long rods, and acting as an anvil or internal mandrel, around which the skelp is pressed and the edges thereof welded by the concave welding-rolls, in forming wrought-metal pipe or tubing. The ordinary form of these welding-balls is provided with a point or tapering forward end, which extends nearly or altogether to the center of the ball and acts to direct the forward end of the skelp onto the portion of the ball at which the edges are welded together, and, as these balls have heretofore been manufactured, it has been necessary to employ with them a separate core to form the central hole or opening to receive the end of the supporting-rod; and in large balls the central part of the ball has been cored out to lighten it, expensive cores being employed for this purpose, and the cost of forming the cores in most cases exceeding the cost of forming the molds in which the cores are placed, so that even though it is extremely desirable to have a light ball, yet on account of the cost of the formation and insertion of the cores the balls have been generally made heavy, a large amount of metal being employed in them, and a simple form of core, which cost but little, being employed with the mold. Though the sizes of wrought-metal tubing manufactured have been largely increased during the last few years, yet the same form of ball has been employed for the manufacture of this large tubing, and in doing so very heavy balls were necessarily employed, the balls requiring in some cases the employment of hoisting apparatus to raise them and place them on the supporting-rods, as for some kind of pipe they weigh from one hundred and fifty to two hundred and fifty pounds each. The heavy ball has also been found objectionable, for the reason that the ball would sag down and bear upon the face of the skelp during welding, and by scraping upon the same had a tendency to thin that portion of the tubing, and as the metal of the skelp was necessarily at a high heat and in a soft condition, the tube formed was often so thinned by the weight of the ball and the scraping thereon by the tubing as to render it imperfect and useless. As before stated, the hollow portion of these balls has heretofore been formed by the cores which entered and were supported at the rear end of the ball, the sides of the opening in the ball being inwardly tapering from the rear end, as the core could be formed in that manner more easily, and for this reason, if the ball were open at the forward end, that opening has also been smaller than the opening at the rear end of the ball.

The principal objects of my invention are to form a pipe-welding ball which is made lighter than the balls heretofore in use, which can be molded without the employment of expensive cores, thus greatly decreasing its cost both in the saving of metal and cost of manufacture, in which the thickness of the metal necessary to support and sustain the welding strain is only employed at the point of welding, while the other end of the ball, which directs the skelp onto the welding portion, is made of only sufficient strength to serve that purpose, and which, by having a large opening at the forward end, will act to receive the slag or scale within the skelp and prevent it from being pressed between the ball and the welding-rolls and thin the pipe at such points, as well as to improve the ball in other particulars, as hereinafter specifically set forth.

To these ends my invention consists, essentially in a pipe-welding ball having the inner walls of the welding portion thereof formed parallel or outwardly flaring toward the point or forward end, so that in the formation of the ball it can be molded without the employment of any cores other than those formed in the mold by the single pattern employed.

It also consists in a pipe-welding ball having a solid body at the rear thereof to form the welding portion, and a series of separate ribs integral with the ball and extending out therefrom and supported by the ball to form the point or tapering forward end, to direct the skelp onto the welding portion of the ball.

It also consists in forming the inner walls of the ball outwardly flaring and providing the ball with a tubular central extension within the hollow thereof, to receive the supporting-rod, the mold for the ball with its tubular extension being of such shape that it can be formed by a single pattern, which can be withdrawn from the mold and leave the finished mold without requiring the use of any cores.

It also consists in providing the ball with a large mouth or open forward end for the reception of any scale or slag gathering within the skelp in front of the ball during welding, this scale or slag entering the mouth of the ball, and so being prevented from passing between the ball and the body of the tubing and forming depressions in the body of the tubing so as to thin or weaken the walls thereof.

It also consists in certain details of construction, as hereinafter more specifically set forth.

To enable others skilled in the art to make and use my invention, I will describe the same more fully, referring to the accompanying drawings, in which—

Figure 1 is a perspective sectional view of a pipe-ball illustrating my invention; and Figs. 2, 3, 4, 5, and 6 are sectional views of different forms of balls embodying the same.

Like letters of reference indicate like parts in each.

The pipe-welding ball preferred by me and most completely embodying my invention, as hereinafter set forth, is shown in Fig. 1, the other views showing modifications of the same and being illustrative of the different manners in which my invention can be applied to use.

The supporting-mandrel A is provided with a shoulder, $a$, against which the end of the ball butts or bears to sustain the longitudinal pressure on it during the welding operation. The ball is provided with the body or welding portion B and with the tapering forward end, $b$, this tapering forward end being shown as formed of a series of ribs, $b'$, as hereinafter more particularly referred to.

The ball has the open mouth or forward end, $c$, and the inner walls, $c'$, of the ball are formed outwardly-flaring or tapering slightly, so that when the ball is molded a pattern corresponding in shape to the ball to be formed may be employed, and the pattern, after the formation of the sand-mold, can be drawn from the sand, leaving a perfect mold corresponding in shape to the ball to be formed without the employment of any separate core whatever, it only being necessary to close the upper end of the mold by a cope or cover. The great advantage of a ball of this form in molding can be appreciated from the fact that the formation of the core of the ordinary ball is generally much more expensive than the formation of the mold proper therefor; and by this form of ball, having the inner walls either parallel or outwardly tapering, the ball can be molded without the employment of separate cores, over one-half the cost of making the molds therefore being saved. In connection with this part of my invention reference is made to the other figures of the drawings, Fig. 2 showing the same form of ball as Fig. 1, except that the separate supporting ring or block for the forward end, hereinafter referred to, is not employed.

Fig. 3 shows the simplest form of my invention, being one of the smallest sizes of balls employed and having its inner walls formed straight or parallel, so that it can be molded as above described and the pattern withdrawn from the sand, leaving the finished mold ready for casting without the employment of a separate core.

Figure 4 shows the same form of ball shown in Fig. 1, except that the tubular extension $d$ is dispensed with, the forward end of the ball being supported by a separate block, as shown in Fig. 1, and the inner walls of the rear opening, through which the supporting-rod enters, being formed parallel, while the inner walls on the body of the ball are formed outwardly tapering.

Figure 5:
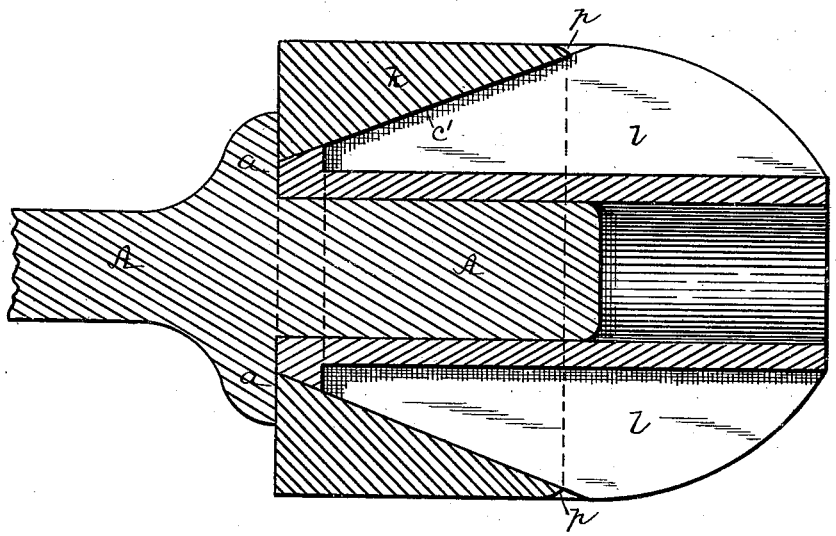

In Fig. 5 is shown a combined ball in which the welding portion is formed separate from the point, the particular construction of this ball forming the subject of a separate application of even date herewith, Serial No. 218,876. The welding portion $k$ of this ball is formed of a separate ring, having the inner walls, $c'$, thereof formed outwardly flaring, so that this portion of the ball can be molded in one operation without the employment of cores. In connection with this form of welding-ball a removable point, $l$, is fitted around the supporting-rod, and the welding portion of the ball surrounds this removable point, both the welding-sleeve and the removable point resting against the shoulder $a$ on the rod.

Figure 6:
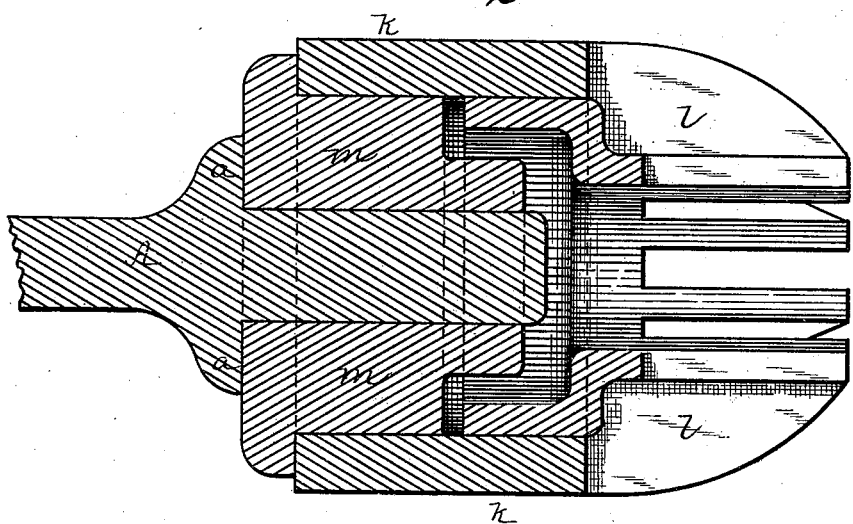

In the ball shown in Fig. 6 the welding portion of the ball is formed of the sleeve $k$, having parallel inner and outer walls, this sleeve fitting on a suitable enlarged head, $m$, on the supporting-rod, and the point $l$ fitting within the sleeve, as shown. The welding portion or sleeve of this ball is of such form that it can be molded without the employment of cores, it, as well as the forms shown in Figs. 3, 4, and 5, embodying this feature of my invention; and by this portion of my invention I am enabled to provide a pipe-welding ball which can be molded without a separate core, and is therefore much cheaper than the ordinary pipe-welding ball, and also a ball in which the necessary thickness of metal for the welding operation is obtained in the part of the ball at which the weld is made, while the remainder of the ball can be made light, so that metal is saved; and in large balls, such as shown in Figs. 5 and 6, the parts can be handled separately, so that the employment of hoisting devices to place them upon the supporting-rod is dispensed with.

Extending out from the body B of the ball are a series of separate ribs, $b'$, there being in the ball shown in Fig. 1 eight separate ribs, and these ribs forming the tapering forward end of the ball, by means of which the skelp is directed onto the solid or welding portion B of the ball, these ribs possessing all necessary strength for this purpose, and at the same time enabling me to make a much lighter and more easily-handled ball, while I obtain all necessary thickness of metal in the solid ball back of the ribs to sustain the pressure in welding and prevent such heating of the ball as to cause its rapid cutting out by the skelp passing over it. These ribs have also the further advantage that they permit the slag or scale within the skelp to enter between them into the open central portion, $c$, of the ball, which forms a large receptacle for scale, and by thus forming a means of escape for the scale prevents its being pressed into the body of the pipe between the welding-ball and the welding-rolls, as before referred to; and by forming the point of separate ribs not joined together I am enabled to break the ball out of the pipe more easily, in case it is stuck therein, as the ribs are unsupported against a side blow, and they cannot brace the body, as is the case with the ordinary ball.

As the skelp might possibly, when highly heated, sag down between the separate longitudinal ribs and catch against the body of the ball, so that it would not pass properly onto the welding portion thereof, I provide in front of the solid welding portion of the ball a curved lip or lips, $p$, these lips, when the point of the ball is formed integral with the welding portion thereof, being formed between the ribs $b'$, and when the sleeve, such as shown in Fig. 5, fitting over a separate ribbed point, is employed, the curved lip extends entirely around the forward end of the welding portion or sleeve, and when the skelp passes over the ribs, instead of striking against a square shoulder, which might act to bend it out of shape, the curved lip or lips act to guide it onto the solid portion of the ball, so that there is no liability of it sagging or being bent out of shape between the longitudinal ribs.

When it is desirable to form a support at the forward end of the welding-ball, I generally extend the forward end of the mandrel A through the hollow portion $c$ of the ball, as at $a^2$, and place around it the separate ring or block $r$, which fits neatly onto the extension $a^2$ of the rod and against the inner walls of the ball, thus forming a sufficient bracing or support to the forward end thereof. This separate supporting-block may be employed in connection with the tubular extension $d$, as shown in Fig. 1; or, in smaller balls, this tubular extension may be dispensed with and the forward end of the ball be braced by the block, as shown in Fig. 4.

When my improved pipe-welding ball is in use and employed, as shown in Fig. 1, the ball is placed upon the supporting-rod A, the tubular portion $d$ fitting around it, and the separate ring or block $r$ is then slipped into the open mouth $c$ of the ball, and acts as a brace between it and the supporting-rod. The ball may be placed upon the mandrel in any desired position, and may be turned thereon to present different faces for receiving the welding strain or the "scoring" or cutting-out, which generally occurs at the point where the weld is formed. As the skelp is pushed in the ordinary manner out of the furnace, the ribs, extending out from the body of the ball, act by their tapering faces to direct the skelp onto the solid or welding portion thereof; and in case the skelp is hot and sags down between the ribs it is again raised to the proper height for passing onto the body of the ball by the lip or lips $p$. The welding operation in such ball would take place at the point marked $x$, where the metal is of sufficient thickness not only to withstand the pressure, but also to give a sufficient body to prevent the heated skelp from melting and cutting the ball. The ribs $b'$, at the forward end of the ball, serve the same purpose as the ordinary solid tapering forward end—that is, to direct the skelp onto the welding part of the ball—while at the same time they provide an entrance for the slag or scoria into the open portion of the ball, and the skeleton forward end of the ball reduces its weight to a large extent. At the same time, in case the slag or scoria becomes banked up in front of the ball, on account of the open mouth $c$, the slag or scale can enter directly through the open mouth into the ball, the open mouth forming a receptacle for the slag, even where the forward end of the ball is not ribbed, as above described. After the welding operation is over the slag or scale can be removed from the ball by drawing out the removable block or ring $r$, thus cleaning out the open mouth of the ball.

The use of the other balls shown is substantially the same, the ball shown in Fig. 3 being a small ball in which it is not necessary to form a large open mouth, as it is employed with tubing not over two inches in diameter. The ball shown in Fig. 4 is adapted for use in the manufacture of tubing between two and five inches diameter, and its use is the same as that described in Fig. 1, which is employed with pipe of larger size; and the balls shown in Figs. 5 and 6 are intended for use in the manufacture of large pipe—such as from ten to twenty-four inches—the forward portions or removable points of the balls acting to guide the skelp onto the welding rings, as above described.

By my invention I am enabled to make the balls much lighter than the different balls of the same diameter employed for the same work, thus, by a saving in metal, reducing their cost, and also enabling the larger sizes of balls to be handled without the employment of hoisting apparatus for raising them to be placed upon the welding-rod. As the inner walls of the balls are either straight or outwardly flaring toward the forward end and the outer faces of the balls are either straight or inwardly tapering toward the forward end, the molds for the balls can be made without the employment of any separate cores, so that the cost of making the molds for the balls is reduced over one-half, and they can be manufactured much more rapidly, thus saving a large amount in the cost of manufacture. At the same time the required thickness of metal can be placed near the part of the ball where it is necessary to withstand the heat and provide strength for welding, while the forward end is made lighter, and yet has all the strength necessary for directing the skelp onto the ball. By the employment of the separate ribs extending out from the body of the ball I obtain a means of guiding the skelp upon the welding portion of the ball, and yet am able to form the molds for these ribs without the employment of expensive coring, as would be necessary where the end of the ball was closed or the ribs connected at their forward ends; and by the employment of the large open mouth at the forward end of the ball I am enabled to provide a large and suitable receptacle for the entrance of slag and to prevent injury therefrom.

What I claim as my invention, and desire to secure by Letters Patent, is—

1. A pipe-molding ball having the welding portion thereof provided with an open forward end and its inner wall parallel or flaring outwardly to the forward end, substantially as and for the purpose set forth.

2. A pipe-welding ball having the inner walls of the welding portion thereof outwardly flaring toward the point, substantially as and for the purposes set forth.

3. A pipe-welding ball having an open forward end for the reception of the slag or scale within the skelp, substantially as and for the purposes set forth.

4. A pipe-welding ball having a solid portion at the rear to form the welding portion thereof and a series of unconnected ribs integral with and extending out from the body to form the tapering point or forward end of the ball, substantially as and for the purposes set forth.

5. A pipe-welding ball having the tubular central extension forming the seat for the supporting-rod and the inner walls of the body formed parallel or outwardly flaring from the base of said extension to the forward end of the ball, substantially as and for the purposes set forth.

6. A pipe-welding ball having the open forward end, in combination with the supporting-rod and the movable block fitting around the rod and supporting the forward end of the ball, substantially as and for the purposes set forth.

7. The pipe-welding ball provided with a series of ribs forming the tapering forward end thereof and having the curved lip or lips in front of the welding portion to direct the skelp from said ribs onto the body of the ball, substantially as and for the purposes set forth.

In testimony whereof I, the said S. JARVIS ADAMS, have hereunto set my hand.

S. JARVIS ADAMS.

Witnesses:
JAMES I. KAY,
J. N. COOKE.